United States Patent [19]

Fried et al.

[11] Patent Number: 4,938,439

[45] Date of Patent: Jul. 3, 1990

[54] AUTOMOBILE ARMREST/TRAY ACCESSORY

[76] Inventors: Hollis Fried, 21 Intervale Ave., Peabody, Mass. 01960; Sandra Torrisi, 16 Lilha La., Reading, Mass. 01867

[21] Appl. No.: 222,157

[22] Filed: Jul. 21, 1988

[51] Int. Cl.$^5$ .............................................. B43L 15/00
[52] U.S. Cl. .................................. 248/118.5; 108/43; 248/444
[58] Field of Search ...................... 248/118, 444, 118.5; 297/227, 194, 188, 411; 108/43, 44; 281/1; 296/153

[56] References Cited

U.S. PATENT DOCUMENTS

| | | | |
|---|---|---|---|
| 3,407,757 | 10/1968 | Warner | 108/43 |
| 3,801,149 | 4/1974 | Reimann | 296/153 X |
| 3,991,966 | 11/1976 | Breer | 108/43 X |
| 4,052,944 | 1/1977 | Jennings | 108/43 |
| 4,592,584 | 6/1986 | White | 297/227 |
| 4,700,634 | 10/1987 | Mills | 108/43 |
| 4,810,026 | 3/1989 | Doane | 296/153 |

Primary Examiner—J. Franklin Foss

[57] ABSTRACT

A portable automobile accessory which is insertable into the interior of an automobile to function as either an armrest or a tray, is comprised of a resilient body member, defined by four planar surfaces and one non-planar surface arranged to form two wedge-shaped ends positioned perpendicular to each other, and a rigid planar support member secured to the resilient body member. When the thin wedge end of the accessory is inserted intermediate bucket-style seats in an automobile, a smooth top surface is available to the user as an armrest. When the wide wedge end of the accessory is placed intermittent the user's leg and the car door, the rigid planar surface of the support member is available to the user as a tray for eating, writing or other similar activities.

5 Claims, 1 Drawing Sheet

AUTOMOBILE ARMREST/TRAY ACCESSORY

FIELD OF THE INVENTION

The present invention relates to the field of automobile accessories, and more specifically, to a utility device for use by the automobile occupants. The present invention provides a portable accessory for use as an armrest in conjunction with bucket style seats in automobiles, as well as a lap tray.

BACKGROUND OF THE INVENTION

Armrests are an integral part of most chairs and seating structures designed to accommodate people for an extended period of time. Most of the seating facilities in buses, trains, planes, and movie theaters, for example, contain arm rest structures for increased comfort; however, automobile seats, particularly bucket-style seats, are an exception.

Early automobiles, which contained rudimentary seating facilities, were completely devoid of armrest structures of any kind. Eventually, automobile manufacturers began to include armrests, located on the driver and passenger doors, to increase comfort as well as to provide a convenient location for door handles, window controls, ash trays, and door locks. More recently, in automobiles with conventional bench style seats, manufacturers have included pivoted center armrests which are integrated with the seat back and can be raised to form part of the seat back or lowered onto the bench between the driver and front passenger seats. In automobiles with bucket-style seats, though, integration of an armrest into the seat back or between the bucket seats is not practical due to the seat design and the distance between the seats.

Tray type structures have also been incorporated into seat backs in trains and aircraft, allowing the occupant to utilize the tray which is pivotally attached to the seat in front of him. Such structures are not practical for automobile interiors. However, with the advent of drive-in banks and fast food franchises and other similar establishments, the need for an automobile interior tray has evolved. Accordingly, there is a need for a tray which can be utilized within the interior of an automobile without encroaching the already limited space of the automobile interior.

It is therefore an object of the present invention to provide an armrest accessory for use in automobiles containing bucket-style seats.

It is a further object of the present invention to provide an armrest accessory for use in automobiles with bucket-style seats which is portable, and can be utilized by either the driver or the front passenger.

It is a further object of the present invention to provide a portable armrest accessory for use in automobiles with bucket-style seats which can be easily positioned or removed without attachment devices such as snaps, straps, or Velcro strips.

Yet another object of the present invention is to provide an automobile accessory which serves as both a portable armrest for use in automobiles with bucket-style seats, and also provides a flat retangular surface for use as a portable tray for eating, writing, or other activities.

BRIEF SUMMARY OF THE INVENTION

The foregoing and other objects of the present invention are achieved with a portable automobile accessory which can be inserted into the interior of an automobile to function as either an armrest or a tray.

According to on embodiment of the present invention, a portable armrest is comprised of a rigid rectangularly shaped support member secured against a resilient wedge-shaped body and covered by fabric which surrounds both the support member and the resilient body. The resilient material may be a urethane foam or a similar material which is capable of recovering its original shape after extended periods of deformation. The resilient body is defined by four substantially planar surfaces and one sloped surface. These surfaces are configured so that two wedge-shaped ends are formed, one long and narrow in shape and the other short and wide in shape. Both wedges ends have a flat surface and slightly sloped surface and are positioned into an L-shape so that their flat surfaces are perpendicular and their sloped surfaces join to form a single non-planar surface. In this manner, both a flat top and a flat side surface are available regardless of which wedge end is used to anchor the accessory within the automobile interior.

In the present embodiment, the support member is a rectangularly shaped board made of a rigid material such as Masonite. The largest planar surface of the resilient body is secured (e.g., glued) to the support member. Besides supporting and adding rigidity to the otherwise resilient resilient body, the support member provides a flat, rigid surface when the accessory is used as a tray.

The covering of the accessory serves to protect both the support member and the resilient body. In the preferred embodiment, the covering means can be comprised of vinyl, leather or fabric or any combination thereof.

In a substantial number of cars having bucket seats, the narrow wedge-shaped end of the accessory is easily inserted into the small crevice-like areas formed between the driver or front passenger seat and the intervening interior structures of the automobile. Once properly inserted, the accessory will remain in position without any physical attachment means. In this position, the top side of the accessory serves as a flat comfortable armrest for the driver or the passenger, depending on the positioning of the accessory within the automobile.

As an alternate use, the accessory may be removed from the position adjacent the bucket seat and positioned over the use s lap with the top side positioned adjacent to the door and the wide wedge-shaped end of the accessory inserted between the user s leg and the door. In this manner, the rigid support member of the accessory serves as a smooth flat tray on which the user may eat, write or perform similar activities.

The invention will be more fully understood from the detailed description set forth below, which should be read in conjunction with the accompanying drawings. The invention is defined in the claims appended at the end of the detailed description, which is offered by way of example only.

DETAILED DESCRIPTION

Figure 1:
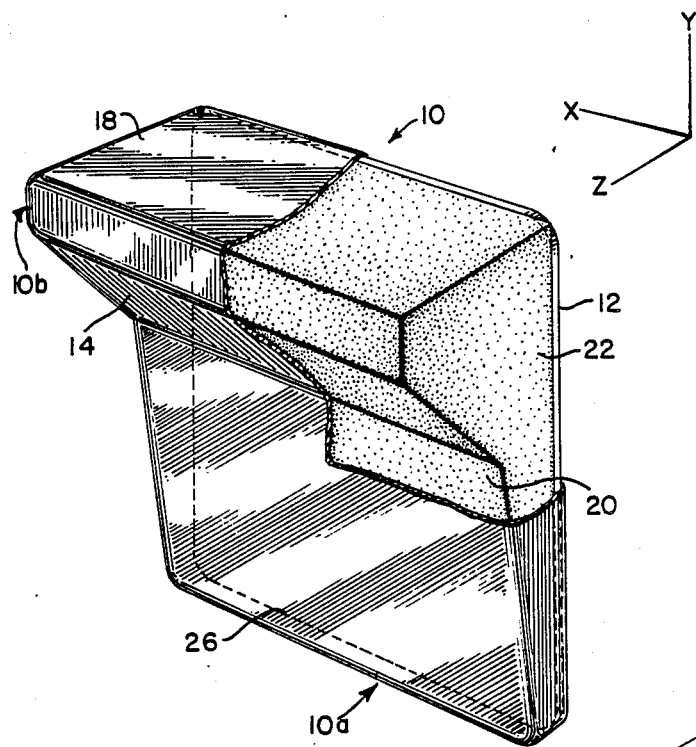
FIG. 1 is a partially cut away perspective view of the preferred embodiment of the present invention illustrating ,its general shape and construction.
Figure 2:
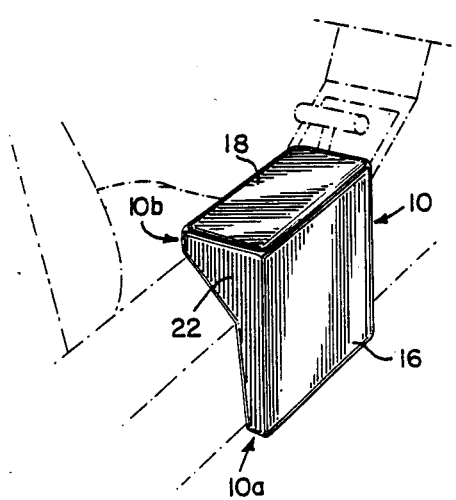
FIG. 2 is a plane perspective view of the present invention illustrating its use as an armrest accessory, with the user's arm and automobile interior shown in phantom.

Referring to the drawings, and in particular FIGS. 1 and 2, a portable accessory 10 is provided, comprised of rigid support member 12, resilient body 14 and covering means 26. In the preferred embodiment, support member 12 is rectangular in shape and lies in the plane defined by the X and Y reference axes, having a height along the Y axis of 15 inches, a width along the X axis of 14 inches, and depth along the Z axis of about ⅛ to 1/5 of an inch. Support member 12 is preferrably made of a rigid material such as Masonite or other particle board compositions having rigid characteristics. In the preferred embodiment, support member 12 is glued directly against resilient body 14.

In the preferred embodiment of the present invention, body 14 is comprised of a resilient material, such as a urethane foam, which is capable of recovering its original shape after extended periods of deformation.

As shown if FIG. 1, resilient body 14 has five surfaces which collectively define a double wedge-type shape. Flat surface 16 of resilient body 14 lies in the same plane and has the same dimensions as support member 12, enabling support member 12 to be secured directly against flat surface 16.

Top surface 18 of resilient body 14 lies in the plane defined by the X and Z reference axes and is perpendicular to flat surface 16 and support member 12. In the preferred embodiment, top surface 18 has the dimensions of 14 inches along the X reference axis and 5½ inches along the Z reference axis. Top surface 18 provides the surface on which the user can rest his arm.

Sloped surface 20 of resilient body 14, is a non-planar surface which connects the non coincident X axis edges of top surface 18 and flat surface 16. In the preferred embodiment, sloped surface 20 has the dimensions of 14 inches along the X reference axis, 15 inches along the Y reference axis, and a depth along the Z reference which varies from 5½ inches at its maximum value along the Y axis (at the top) to less than ⅛ inch at its minimum value along the Y axis (at the bottom).

Sloped surface 20, in the preferred embodiment, may have a continuous curved shape, as described above, or, a sloping shape may be approximated by several small planar surfaces with coincident edges, as shown in FIG. 1. The use of either a continuous curve for sloped surface 20 or a number of small planar surfaces to approximate a slope results in identical functionality of accessory 10.

Two other surfaces, front surface 22 and rear surface 24 lie in the plane defined by the Y and Z reference axes. Rear surface 24 and front surface 22 have the same dimensions, namely a height of 15 inches along the Y reference axis, and a width that varies along a Z axis from 5½ inches to ⅛ inch to accommodate the non-planar shape of the curved surface 20.

The dimensions of surfaces 16–24 and support member 12, listed above, are approximations designed to accomodate the interiors of most modern automobiles. Slight variations to these approximate dimensions may be readily made without adversly affecting the functionality of accessory 10.

Sloped surface 20 and flat surface 16 in conjunction with front and rear surfaces 22 and 24 collectively form narrow wedge end 10A of accessory 10. When used as an armrest, narrow wedge end 10A anchors accessory 10 in a vertical position within the automobile interior so that top surface 18 is available to the user. Sloped surface 20 and top surface 18 in conjunction with front and rear surfaces 22 and 24 collectively form wide wedge end 10B. When used as a tray, wedge end 10B may be urged against one of the doors, by the user's thigh, to anchor accessory 10 within the automobile interior, so that flat surface 16 is available to the user. With this design, either of two flat rectangular surfaces is available to the user depending upon which wedge end, 10A or 10B, secures the armrest accessory within the automobile interior.

In the preferred embodiment, an external covering means 26 tightly surrounds resilient body 14 and support member 12 and is sewn securely in place. Covering means 26 can be comprised of vinyl, leather, fabric or any combination thereof.

The purpose of the external covering means 26 is to protect the resilient body 14 and aesthetically enhance the appearance of accessory 10. If a urethane foam with a hardened surface is used to form resilient body 14, external covering 26 may be eliminated completely without adversly affecting the functionality of accessory 10.

Having described the elements which comprise accessory 10, a description of its functionality and applications follows. When used in the armrest mode, armrest accessory 10 is positioned adjacent to the right side of the driver seat or the left side of the front passenger seat. In most automobiles containing bucket-styled seats, intermittent interior structures exist between the bucket seats. Separating the bucket seats from the intermittent interior structure are two narrow, crevice-like areas of varying depth, usually several inches deep.

As shown in FIG. 2, narrow wedge end 10A of accessory 10 can be inserted into either of these narrow crevice-like areas. Support member 12 of accessory 10 adds rigidity to resilient body 14 enabling easy insertion and supports resilient body 14 in an upright position once accessory 10 is in place. Resilient body 14 is adaptable to spaces of varying widths. Upon insertion into the crevice-like area, resilient body 14 contracts to adapt to the width and shape of the crevice walls. Once inserted, resilient body 14 expands against the walls of the crevice area with enough pressure to secure accessory 10 firmly in place.

Once in the upright position the user may comfortably rest his arm shown in phantom in FIG. 2, on top surface 18. The weight of the user's arm is supported by support member 12 and resilient body 14, with additional support provided by the intermittent interior structure over which resilient body 14 is positioned.

The design of accessory 10 provides the user with a portable armrest which is rigid enough to comfortably support the weight of his and yet resilient enough to conform to most automobile interiors and remain secured in place without special attachment means such as snaps, straps or Velcro strips.

Figure 3:
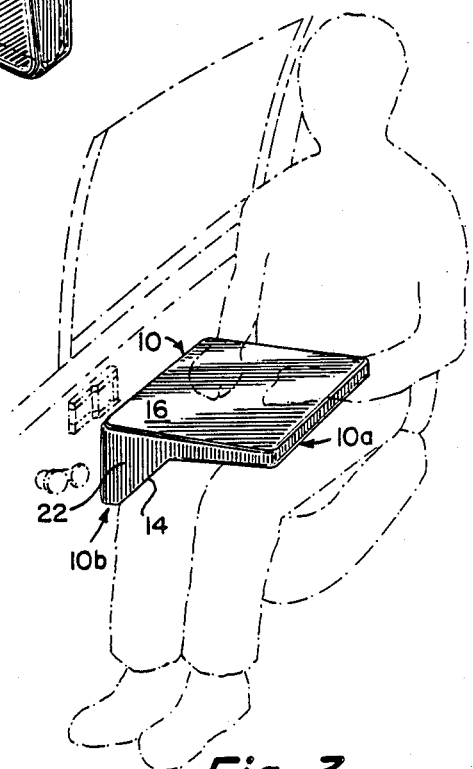
FIG. 3 is a plane perspective view of the present invention illustrating its use as a tray accessory, with the user s leg and automobile door shown in phantom.

When accessory 10 is used as a tray, the invention is merely repositioned to achieve a secondary functionality. In this mode, as shown in FIG. 3, the user places accessory 10 directly over his leg closest to the door with sloped surface 20 adapting to the shape of the leg. In this position, top surface 18 lies adjacent and parallel to the door. Rigid support member 12 is now perpendicular to the user's posture, providing the user with a flat, rectangular surface of approximately 1½ square feet which is usable for writing, eating or other activities. In this position, the user applies pressure with his leg to wide wedge end 10B securing top surface 18 against the door. The user's leg supports accessory 10 under the weight of the user's activities and maintains support member 12 in a relatively horizontal position. In this mode, resilient body 14, absorbs forces normal to support member 12 and prevents translation of these forces to the user's leg.

The symmetrical design of accessory 10 allows the accessory to be used as both an armrest or a tray by either the driver or the front passenger. Use of accessory 10 as a tray by the driver is not recommended when the automobile is in motion.

Having thus described one particular embodiment, various alterations, modifications and improvements will readily occur to those skilled in the art. Such alterations, modifications and improvements as are made obvious by this disclosure are intended to be part of this disclosure though not expressly stated herein, and are intended to be in the spirit and scope of the invention. Accordingly, the foregoing description is intended to be exemplary only and not limiting. The invention is limited only as defined in the following claims and equivalents thereto.

What is claimed is

1. A portable accessory for use in automobiles, comprising:
   a body member defined by at least two rectangular, planar surfaces and at least one non-planar surface, said planar surfaces positioned substantially perpendicular to one another so as to have a coincident edge therebetween, said non-planar surface extending between the edge of each planar surface which is opposed to said coincident edge, a first of said planar surfaces having greater area than a second of said planar surfaces; and
   a rectangular, planar support member lying in a plane parallel with and secured adjacent to said first planar surface.

2. The accessory of any of claim 1 wherein said support member is comprised of a planar rigid material.

3. The accessory of any of claim 1 wherein said body member is comprised of a resilient material.

4. The accessory of claim 1 wherein said wedge-shaped ends are disposed at an angle of approximately 90° to each other.

5. The accessory of claim 1 further including an external covering means, surrounding said body member and said support member.

* * * * *